No. 770,895. PATENTED SEPT. 27, 1904.
W. P. ELLIOTT & W. P. ELLIOTT, Jr.
GATE.
APPLICATION FILED APR. 22, 1904.
NO MODEL. 4 SHEETS—SHEET 1.

Witnesses:
Inventors:
William P. Elliott,
William P. Elliott, Jr.

No. 770,895. PATENTED SEPT. 27, 1904.
W. P. ELLIOTT & W. P. ELLIOTT, Jr.
GATE.
APPLICATION FILED APR. 22, 1904.
NO MODEL. 4 SHEETS—SHEET 2.

Witnesses:
Inventors:
William P. Elliott
William P. Elliott Jr.

No. 770,895. PATENTED SEPT. 27, 1904.
W. P. ELLIOTT & W. P. ELLIOTT, Jr.
GATE.
APPLICATION FILED APR. 22, 1904.
NO MODEL. 4 SHEETS—SHEET 3.

Witnesses:
Inventors:
William P. Elliott,
William P. Elliott Jr.

No. 770,895. PATENTED SEPT. 27, 1904.
W. P. ELLIOTT & W. P. ELLIOTT, Jr.
GATE.
APPLICATION FILED APR. 22, 1904.
NO MODEL. 4 SHEETS—SHEET 4.
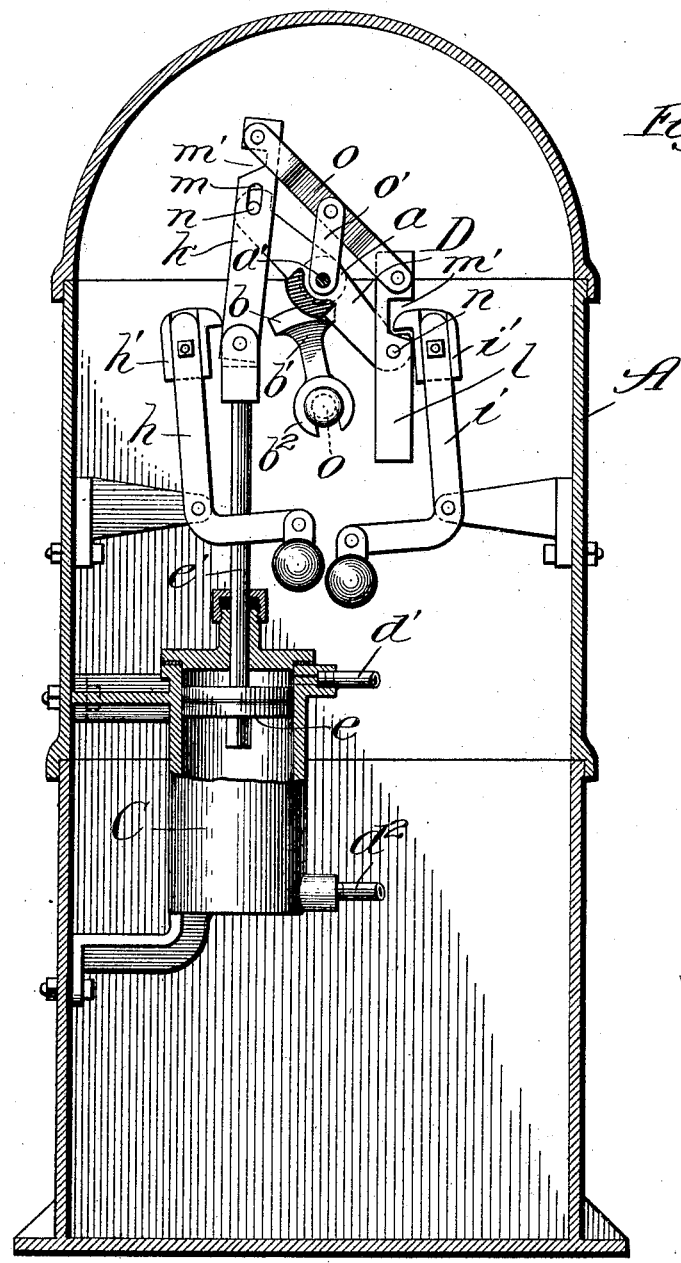

No. 770,895. Patented September 27, 1904.

UNITED STATES PATENT OFFICE.

WILLIAM P. ELLIOTT AND WILLIAM P. ELLIOTT, JR., OF CHICAGO, ILLINOIS.

GATE.

SPECIFICATION forming part of Letters Patent No. 770,895, dated September 27, 1904.

Application filed April 22, 1904. Serial No. 204,349. (No model.)

*To all whom it may concern:*

Be it known that we, WILLIAM P. ELLIOTT and WILLIAM P. ELLIOTT, Jr., citizens of the United States, residing at Chicago, in the county of Cook and State of Illinois, have invented a new and useful Improvement in Gates, of which the following is a specification.

Our invention relates to an improvement in the class of pneumatically-operated gates of the variety set forth in United States Letters Patent No. 368,522, dated August 16, 1887, to William P. Elliott, one of the present applicants, involving a vertically-swinging arm on a post containing piston and cylinder mechanism connected with the arm for lowering it to its position of a barrier and for raising it from that position.

The primary object of our invention is to provide a gate-operating mechanism in the class referred to of a construction improved in the light of practical experience gained in the continuous manufacture and instalment of such gates during a period of many years to the attainment of mechanical perfection in its details and the combination of its parts tending to perfection in its operation.

With this primary object in view our more specific objects are to provide for disposing the mechanism in the post so far above the base of the latter as to permit the base to remain uncovered without danger of the rise within it of water to a sufficient height to reach the movable parts and impair or obstruct their operation by freezing of the water during the cold weather to which the gate may be exposed, to arrange the parts so high in the post that they shall be conveniently accessible for inspection and repair, and to improve the arm actuating and locking mechanisms in matters of detail.

Figure 1:
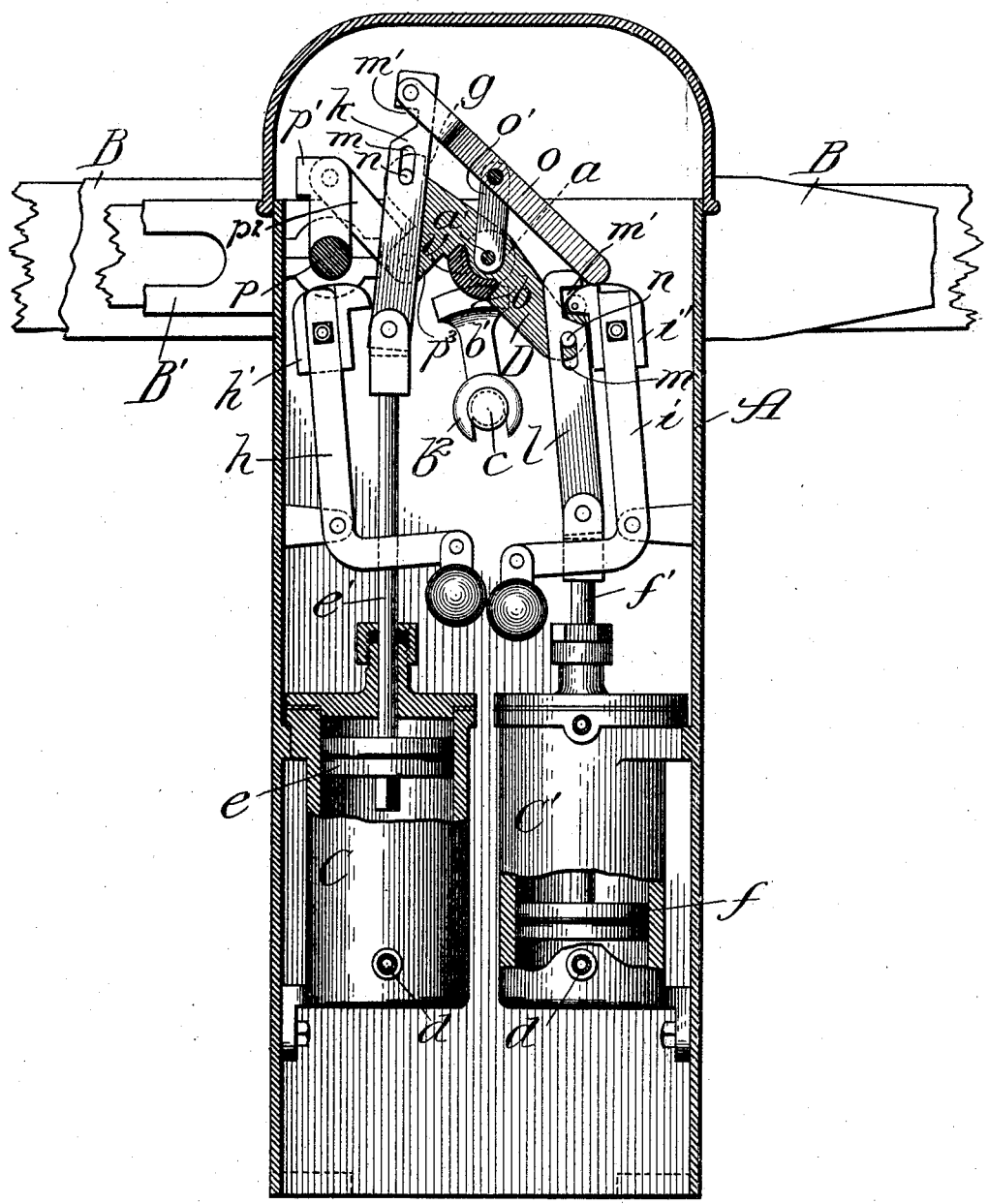
Figure 2:
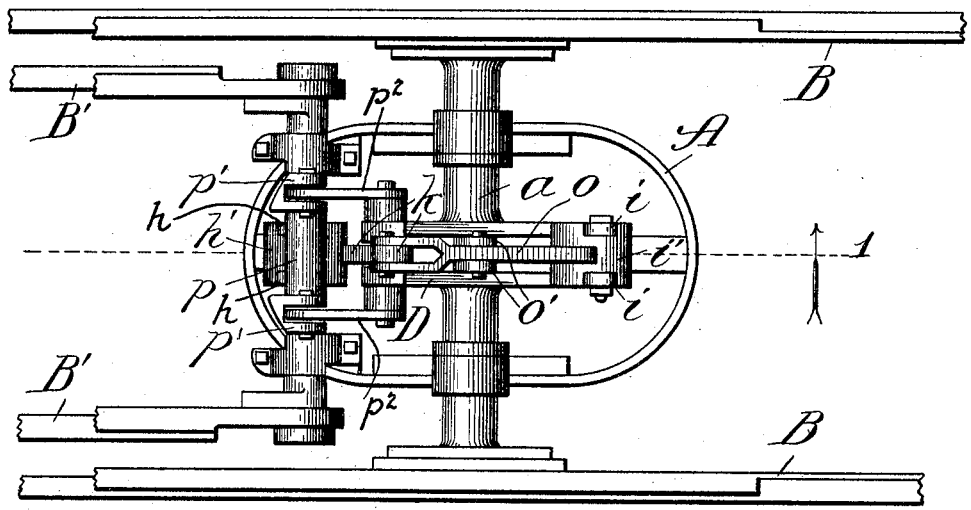
Figure 3:
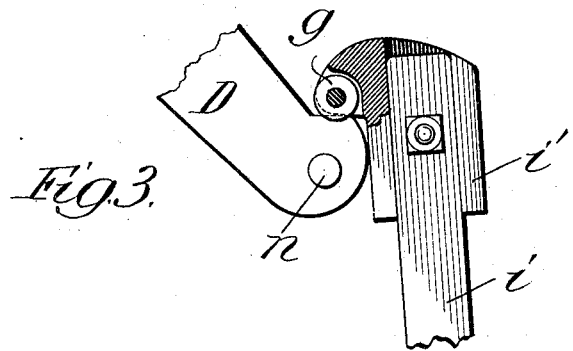
Figure 4:
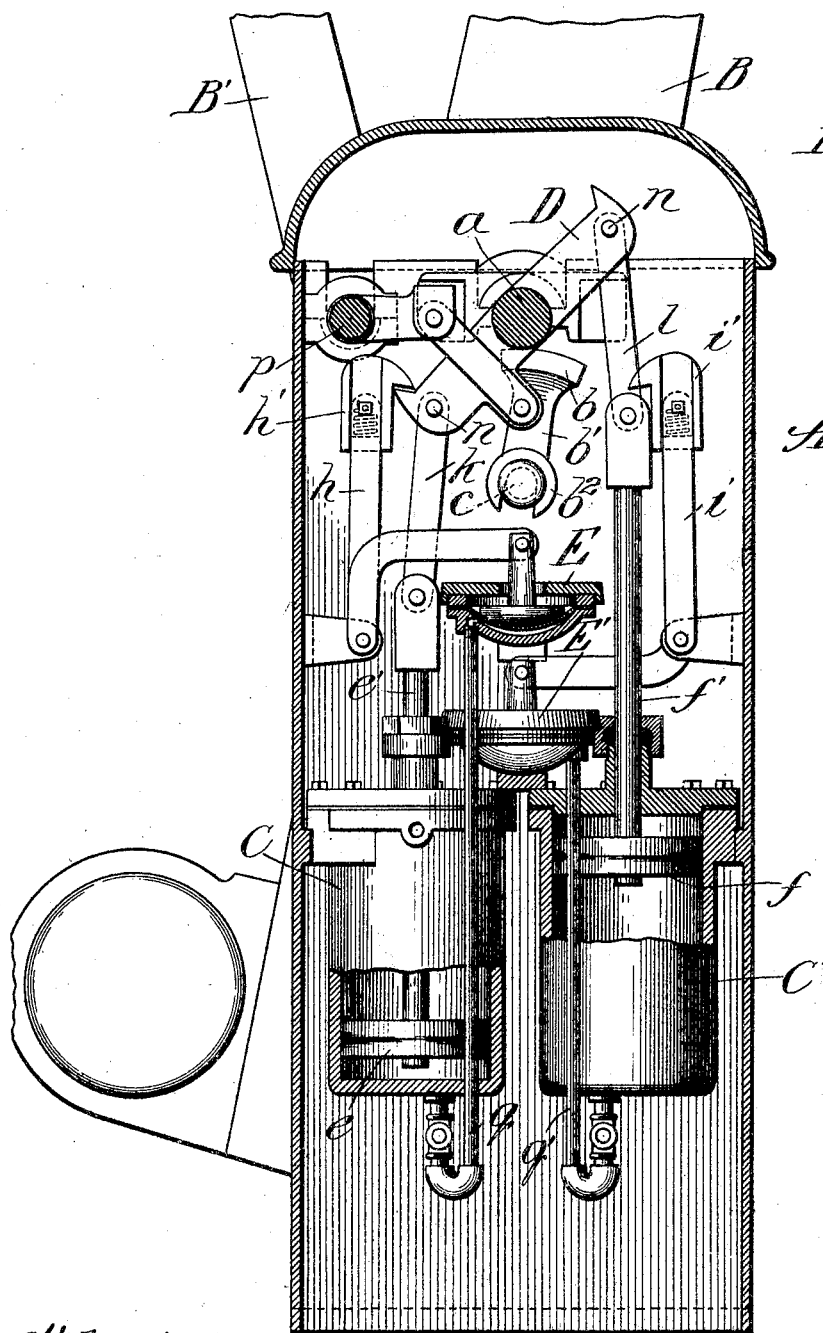

In the accompanying drawings, Figure 1 is a vertical section taken at the line 1 on Fig. 2 and viewed in the direction of the arrow, showing the arm-operating mechanism and one form of its automatic locking mechanism within the hollow post with the ends of the swinging arms broken away; Fig. 2, a plan view of the same with the post-cover removed; Fig. 3, a broken sectional view of one end portion of a walking-beam on the gate-arm shaft coöperating with a latch-head, showing a detail of construction; Fig. 4, a view like that presented by Fig. 1, but showing the gate-arm in its raised position and a modified construction of its locking mechanism, and Fig. 5 a similar view showing the operating and locking mechanisms adapted for a single-arm gate.

Referring more particularly to Figs. 1 to 3, A is the hollow gate-post, having its swinging arm B, which should be weighted at its rear end to counterbalance it and which embraces the post, provided with a shaft $a$, on which it is journaled in the sides of the post, the shaft bearing on the segmental heads $b$ of parallel arms $b'$, supported at their bifurcated lower ends $b^2$ to rock on a stationary shaft $c$, extending between the sides of the post below the shaft $a$. Only one of these rocking arms $b'$ is shown, owing to the nature of the views selected for illustration. This construction affords an antifriction-bearing for the arm commonly employed in gates of the present class. The post may be open at its base, as shown, and above the base are supported on the inner walls of the post the cylinders C and C', each having an inlet-opening $d$ near its base for connection with the air-pressure supply (not shown) to effect the rise alternately of the pistons $e$ and $f$ in the respective cylinders, having their stems $e'$ and $f'$ extending through stuffing-boxes on their upper heads to engage with the arm-locking mechanism hereinafter described.

The shaft $a$, as shown, is a casting comprising two shaft-sections projecting from opposite sides of a walking-beam D, formed of two parallel arms joined at their bases by a tie $v$. Adjacent to the piston-stems are fulcrumed between their ends on bearings extending from the opposite walls of the post above the cylinders therein bell-cranks $h$ and $i$, each formed of two parallel members, with latch-heads $h'$ and $i'$ bolted between the upper ends of the members and extending at their latch portions, which are provided with antifriction-rollers $g$, into the paths of the respective ends of the walking-beam D, each bell-crank being shown weighted at its lower extremity to cause it to tend to maintain that position. Links $k$ and $l$ are pivoted at their lower ends, respectively, to the upper ends of the piston-stems $e'$ and $f'$, each link containing above its transverse center a longitudinal slot $m$, at which it engages with a stud $n$, extending between the side sections of the walking-beam, near the adjacent end thereof, and a cam-slot $m'$ in one edge near its upper end to engage with the respective catch in its path on the upper end of a bell-crank. A lever $o$ is fulcrumed between its ends between a pair of links $o'$, extending between the parallel arms of the walking-beam and pivoted at their lower ends on a pin $a'$ passing centrally through the shaft-sections, and therefore crossing the space between said walking-beam arms or sections, one end of this lever being bifurcated and pivotally connected with the link $k$ near its upper end and the other end of the lever extending into the path of the link $l$.

It is customary in gates of the present class to provide with each barrier B on a post a supplemental arm B' as a barrier to extend across the sidewalk and to cause the two barriers to operate together. The arm B' is supported on a shaft $p$, journaled in opposite sides of the post and having crank-arms $p'$ extending from its opposite ends, with links $p^2$, connecting the crank-arms with crank-fingers $p^3$, projecting from the lower edges of the parallel walking-beam arms.

To understand the operation, it should be borne in mind that it is usual in the present class of gates, where each gate is formed with two arms supported on posts at opposite sides of the roadway to be protected to swing toward each other to lower them and in the contrary direction to raise them, to employ in each post two cylinders and to provide an air-tie through piping extended, preferably, underground, connecting the cylinders in pairs between the opposite posts. The effect thereby produced is to cause the piston in each cylinder in moving to discharge the air ahead of it against the piston in the companion cylinder to act as a cushioning obstruction between the cylinders to produce a tendency to uniform movements of the coöperating gate-arms against the tendency to the contrary of any opposing force, such as the wind.

The operation is as follows: To raise the gate-arms B B' from their position in Fig. 1, air is pumped into the cylinder C' at $d$, thereby raising the piston $f$, with the following results: The link $l$ rises and by the engagement of its cam-notch $m'$ with the catch $i'$ turns the latter aside on the fulcrum of the bell-crank $i$ to unlock the walking-beam D. Furthermore, the link engages the free end of the lever $o$, raising it and lowering its opposite end and with it the link $k$. When the lost motion of the links relative to the walking-beam due to the link-slots $m$ is thus taken up, the respective ends of the slots bear against the pins $n$ on the walking-beam, thereby causing the continued rise of the piston $f$ to lower the piston $e$ and turn the walking-beam and with it the shaft $a$ to raise the arms B B'. In the raised position of the arms the notch $m'$ in the link $k$ will have attained coincidence with the catch $h'$, permitting the latter to be turned into engagement with the adjacent end of the walking-beam, then registering therewith to lock the arms in such position by the turning of the bell-crank $h$ under the influence of the weight suspended upon it. The parts are then in the reverse relative positions to those in which they are represented in Fig. 1, ready for again lowering the arms by pumping air into the cylinder C to raise the piston $e$ therein, with the effect of preparatorily causing the link $k$ to force aside the latch $h'$ and unlock the walking-beam.

According to the modified construction illustrated in Fig. 4, wherein the gate-arms are shown in their raised position, the levers $h$ and $i$ instead of being weighted are controlled by diaphragm devices E and E', supported on opposite inner sides of the post and communicating, respectively, through pipes $q$ and $q'$ with the air-supply to the cylinders C and C'. The lever $o$ is omitted from the locking mechanism, and the links $l$ and $k$, which are devoid of slots $m$ and cam-notches $m'$, are pivotally connected at their upper ends directly with the pins $n$ on the ends of the walking-beam D, which ends are adapted to interlock, respectively, with the catches $h'$ and $i'$. By this arrangement when air is pumped into the cylinder C to raise the piston $e$ therein for lowering the gate-arms the air which enters the diaphragm device E through the pipe $q$ actuates the diaphragm to preparatorily turn the lever $h$ to disengage the catch $h'$ from the walking-beam and free the latter to permit it to be turned by the rising link $k$ for lowering the arms, they being locked when lowered by engagement of the catch $i'$ with the end of the walking-beam then coincident with it, and the release of the arms preparatory to raising them by pumping air into the cylinder C' is effected by the entry of air through the pipe $q'$ into the diaphragm device E' to turn the bell-crank $i$, and thus disengage the catch $i'$ from the walking-beam.

Fig. 5 shows the gate-post equipped with only one cylinder, C, for both raising and lowering the gate-arm (or gate-arms where the sidewalk-arm is also provided) by pumping air into the cylinder alternately against the opposite faces of the piston $e$ therein through the pipes $d'$ and $d^2$, leading thereto. This construction is adapted for use where the gate is formed to meet certain requirements, with only one arm-carrying post, as for narrow roadways. The locking mechanism is in the main like that of Fig. 1; but the link *l* being free at its lower end requires no lost-motion slot *m*, but is pivotally connected at its upper end with the adjacent end of the lever *o* and fulcrumed between its ends to the pin *n* on the adjacent end of the walking-beam D. When air is pumped into the cylinder to lower the piston, the link *k* is drawn down to the upper end of its slot *m*, with the effect of turning the lever *o* to raise the link *l* and cause it to turn aside the catch *i'* for unlocking the walking-beam, so that it may be turned for moving the gate-arm by the continued movement of the piston, at the end of which the catch *h'* locks the walking-beam until released by movement of the piston in the opposite direction, whereby the link *k* throws out the catch *h'* in the lost motion afforded to it by the slot *m*.

The different described forms of the gate-arm actuating and locking mechanisms are equally desirable and effective in their purposes, and they may be variously modified without departure from the invention, and by supporting and disposing them within the post so that all the movable parts are above the cylinder or cylinders therein they are beyond the reach, under a wide range of normal conditions, of water rising in the post, and therefore out of danger of being obstructed or impaired by freezing of the water, and they are also conveniently accessible through the upper end of the post for inspection and repair.

What we claim as new, and desire to secure by Letters Patent, is—

1. In a pneumatic gate of the character described, the combination of a hollow post, an arm on a shaft journaled on said post to swing vertically, a walking-beam on said shaft, a fluid-pressure cylinder in the post, containing a piston having a stem, a pivotal latch device in the post engaging said walking-beam in one position to lock the arm, and a link connection between said stem and walking-beam, into the path of which said latch projects to be disengaged from the walking-beam by the movement of the link, substantially as and for the purpose set forth.

2. In a pneumatic gate of the character described, the combination of a hollow post, an arm on a shaft journaled on said post to swing vertically, a walking-beam on said shaft, a fluid-pressure cylinder in the post, containing a piston having a stem, a pivotal latch device in the post engaging said walking-beam in one position to lock the arm, and a link having a lost-motion connection with said walking-beam and connecting the latter with said stem, said latch device projecting into the path of the link to be disengaged by its movement from the walking-beam, substantially as and for the purpose set forth.

3. In a pneumatic gate of the character described, the combination of a hollow post, an arm on a shaft journaled on said post to swing vertically, a walking-beam on said shaft, a fluid-pressure cylinder in the post, containing a piston having a stem, a bell-crank lever fulcrumed in the post carrying a latch engaging said walking-beam in one position to lock the arm, and a link connection between said stem and walking-beam, into the path of which said latch projects to be disengaged from the walking-beam by the movement of the link, substantially as and for the purpose set forth.

4. In a pneumatic gate of the character described, the combination of a hollow post, an arm on a shaft journaled on said post to swing vertically, a walking-beam on said shaft, a fluid-pressure cylinder in the post, containing a piston having a stem, pivotal latch devices in the post alternately engaging said walking-beam to lock the arm in its raised and lowered positions, a link connecting said stem with one end of the walking-beam and a link connected with the opposite end of the walking-beam, said latches projecting into the paths of the respective links to be disengaged alternately by their movements from the walking-beam, substantially as and for the purpose set forth.

5. In a pneumatic gate of the character described, the combination of a hollow post, an arm on a shaft journaled on said post to swing vertically, a walking-beam on said shaft, a supplemental gate-arm journaled on the post and connected with the walking-beam to be actuated by its movements, a fluid-pressure cylinder in the post, containing a piston having a stem, a pivotal latch device in the post engaging said walking-beam in one position to lock the arm, and a link connection between said stem and walking-beam, into the path of which said latch projects to be disengaged from the walking-beam by the movement of the link, substantially as and for the purpose set forth.

6. In a pneumatic gate of the character described, the combination of a hollow post, an arm on a shaft journaled on said post to swing vertically, a walking-beam on said shaft, a pair of fluid-pressure cylinders in the post, each containing a piston having a stem, pivotal latch devices in the post alternately engaging said walking-beam to lock the arm in its raised and lowered positions, and links connecting said stems with the walking-beam at opposite sides of its fulcrum, said latches projecting into the paths of the respective links to be disengaged alternately by their movements from the walking-beam, substantially as and for the purpose set forth.

7. In a pneumatic gate of the character described, the combination of a hollow post, an arm on a shaft journaled on said post to swing vertically, a walking-beam on said shaft, a pair of fluid-pressure cylinders in the post, each containing a piston having a stem, pivotal latch devices in the post alternately engaging said walking-beam to lock the arm in its raised and lowered positions, links connected with said stem and having lost-motion connection with the walking-beam at opposite sides of its fulcrum, and a lever fulcrumed between its ends and extending from the upper end of one link to that of the other, said latches projecting into the paths of the respective links to be disengaged alternately by their movements from the walking-beam, substantially as and for the purpose set forth.

8. In a pneumatic gate of the character described, the combination of a hollow post, an arm on a shaft journaled on said post to swing vertically, pivotal latch devices in the post alternately engaging said walking-beam to lock the arm in its raised and lowered positions, links connected at their lower ends with said stems, provided toward their upper ends with longitudinal slots engaging with pins on the walking-beam near its opposite ends and, beyond said slots, with cam-notches, and a lever fulcrumed between its ends and extending from one said link into the path of the other, said latches projecting into the paths of the respective links to be disengaged alternately by their movements from the walking-beam, substantially as and for the purpose set forth.

WILLIAM P. ELLIOTT.
WILLIAM P. ELLIOTT, JR.

In presence of—
L. HEISLAR,
WALTER N. WINBERG.